US008840514B1

(12) United States Patent
Knickerbocker et al.

(10) Patent No.: US 8,840,514 B1
(45) Date of Patent: Sep. 23, 2014

(54) BI-DIRECTIONAL OVERRUNNING CLUTCH WITH IMPROVED INDEXING MECHANISM

(71) Applicant: The Hilliard Corporation, Elmira, NY (US)

(72) Inventors: Howard J. Knickerbocker, Elmira, NY (US); David C. Ochab, Horseheads, NY (US); Mathew Cowen, Horseheads, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 14/205,945

(22) Filed: Mar. 12, 2014

Related U.S. Application Data

(60) Provisional application No. 61/783,125, filed on Mar. 14, 2013.

(51) Int. Cl.
*F16H 48/06* (2006.01)
*B60W 10/02* (2006.01)
*B60W 10/12* (2012.01)

(52) U.S. Cl.
CPC ............. *B60W 10/02* (2013.01); *B60W 10/12* (2013.01)
USPC ........................................................ 475/220

(58) Field of Classification Search
USPC ......... 475/220, 202, 221, 203, 200, 205, 198, 475/206; 74/606 R, 665 F, 665 G, 665 R; 180/233, 247; 192/84.1, 35, 84.8, 192/103 R
See application file for complete search history.

(56) References Cited

U.S. PATENT DOCUMENTS

| 5,348,126 | A  | 9/1994  | Gao             |
|-----------|----|---------|-----------------|
| 6,409,000 | B1 | 6/2002  | Itoh et al.     |
| RE38,012  | E  | 3/2003  | Ochab et al.    |
| 6,530,447 | B2 | 3/2003  | Seki et al.     |
| 6,622,837 | B2 | 9/2003  | Ochab et al.    |
| 6,629,590 | B2 | 10/2003 | Ochab et al.    |
| 6,652,407 | B2 | 11/2003 | Ronk et al.     |
| 6,834,750 | B2 | 12/2004 | Baker et al.    |
| 7,032,732 | B2 | 4/2006  | Muramatsu et al.|

(Continued)

OTHER PUBLICATIONS

International Search Report for PCT/US2014/024585, Jul. 1, 2014, 3 pgs.

(Continued)

*Primary Examiner* — Saul Rodriguez
*Assistant Examiner* — David J Hlavka
(74) *Attorney, Agent, or Firm* — Drinker Biddle & Reath LLP

(57) ABSTRACT

A bi-directional overrunning clutch assembly for engaging secondary driven shafts in a four wheel drive vehicle. The assembly includes a differential housing with a pinion input gear rotatably disposed within it that is engaged to a drive shaft. A bi-directional overrunning clutch housing is engaged to the pinion gear. A roll cage assembly is located inside the clutch housing. A pair of hubs are positioned within the roll cage assembly and connected to the secondary driven shafts. An electromagnetic system controls indexes the roll cage in a first direction relative to the clutch housing a first indexing device for coupling the secondary drive shaft to the secondary driven axles when four wheel drive is needed, and in an opposite direction using a second indexing device when an engine braking condition is needed. A spring assembly is preferably used to bias the roll cage back to a neutral position.

28 Claims, 12 Drawing Sheets

(56) References Cited

U.S. PATENT DOCUMENTS

| | | | |
|---|---|---|---|
| 7,938,041 B1 | 5/2011 | Shiigi et al. | |
| 8,272,487 B2* | 9/2012 | Sato | 192/35 |
| 8,312,792 B1* | 11/2012 | Kochidomari et al. | 74/665 F |
| 2002/0063027 A1* | 5/2002 | Karambelas et al. | 192/35 |
| 2002/0125095 A1* | 9/2002 | Ochab et al. | 192/35 |
| 2004/0182670 A1 | 9/2004 | Nojiri et al. | |
| 2005/0077137 A1 | 4/2005 | Nozaki et al. | |
| 2007/0170029 A1 | 7/2007 | Okada et al. | |
| 2010/0059325 A1 | 3/2010 | Boyer | |
| 2012/0152686 A1 | 6/2012 | Brewer et al. | |

OTHER PUBLICATIONS

International Written Opinion for PCT/US2014/024585, Jul. 1, 2014, 4 pgs.

* cited by examiner

BI-DIRECTIONAL OVERRUNNING CLUTCH WITH IMPROVED INDEXING MECHANISM

RELATED APPLICATION

This is a non-provisional US patent application claiming priority to U.S. Provisional Patent Application 61/783,125, filed on Mar. 14, 2013, the disclosure of which is incorporated herein by reference in its entirety.

FIELD OF THE INVENTION

The present invention relates to clutches and, more particularly, to an electro-mechanical bi-directional overrunning clutch for providing four wheel drive capability.

BACKGROUND OF THE INVENTION

The increased demand in recent years for off-road and all terrain vehicles has led to tremendous developments in those types of vehicles. Many of the developments have centered around making the vehicle more adaptable to changing road conditions, e.g., dirt roads, pavement and gravel. As the road terrain changes, it is desirable to vary the driving capabilities of the vehicle to more efficiently navigate the new terrain. Prior four-wheel drive and all terrain vehicles were cumbersome since they required the operator to manually engage and disengage the secondary drive shaft, e.g., by stopping the vehicle to physically lock/unlock the wheel hubs. Improvements in vehicle drive trains, such as the development of automated systems for engaging and disengaging a driven axle, eliminated many of the problems of the prior designs. These automated drive systems are sometimes referred to as "on-the-fly" four wheel drive. These systems, however, require the vehicle to be in either 2-wheel or 4-wheel drive at all times.

Generally, all four-wheel drive vehicles include a differential for transferring torque from a drive shaft to the driven shafts that are attached to the wheels. Typically, the driven shafts (or half shafts) are independent of one another allowing differential action to occur when one wheel attempts to rotate at a different speed than the other, for example when the vehicle turns. The differential action also eliminates tire scrubbing, reduces transmission loads and reduces understeering during cornering (the tendency to go straight in a corner). There are four main types of conventional differentials: open, limited slip, locking, and center differentials. An open differential allows differential action between the half shafts but, when one wheel loses traction, all available torque is transferred to the wheel without traction resulting in the vehicle stopping.

A limited slip differential overcomes the problems with the open differential by transferring all torque to the wheel that is not slipping. Some of the more expensive limited slip differentials use sensors and hydraulic pressure to actuate the clutch packs locking the two half shafts together. The benefits of these hydraulic (or viscous) units are often overshadowed by their cost, since they require expensive fluids and complex pumping systems. The heat generated in these systems, especially when used for prolonged periods of time may also require the addition of an auxiliary fluid cooling source.

The third type of differential is a locking differential that uses clutches to lock the two half shafts together or incorporates a mechanical link connecting the two shafts. In these types of differentials, both wheels can transmit torque regardless of traction. The primary drawback to these types of differentials is that the two half shafts are no longer independent of each other. As such, the half shafts are either locked or unlocked to one another. This can result in problems during turning where the outside wheel tries to rotate faster than the inside wheel. Since the half shafts are locked together, one wheel must scrub. Another problem that occurs in locking differentials is twichiness when cornering due to the inability of the two shafts to turn at different speeds.

The final type of differential is a center differential. These types of differentials are used in the transfer case of a four wheel drive vehicle to develop a torque split between the front and rear drive shafts.

Many differentials on the market today use some form of an overrunning clutch to transmit torque when needed to a driven shaft. One successful use of an overrunning clutch in an all terrain vehicle is disclosed in U.S. Pat. No. 5,971,123, commonly owned by the assignee of the present invention and incorporated herein by reference in its entirety. In that patent, the vehicle incorporates an overrunning clutch that uses an electromagnetic device for controlling engagement of the four wheel drive mechanism, and a second electromagnetic device for providing the vehicle with engine braking capability. That patent describes an innovative electro-mechanical bi-directional overrunning clutch differential which addressed many of the problems inherent in the prior drive systems. The bi-directional overrunning clutch differential utilized an electrically controlled coil to advance and/or retard a roll cage, thereby controlling the ability of the differential to engage and disengage depending on the operational state of the primary and secondary wheels. The bi-directional differential in U.S. Pat. No. 5,971,123 also describes a backdrive system. The backdrive system actively engages the secondary shafts in certain situations where extra traction is needed. For example, when the vehicle is driving down a slope the system engages the front wheels, which are the wheels with the better traction.

U.S. Pat. No. 6,722,484 discloses another bi-directional overrunning clutch that is useful on the primary drive axle for providing continuous engagement with overrunning capability, while at the same time providing engine braking capability. The overrunning clutch includes at least one friction member which is in contact with the roll cage and the hub such that, during operation, the friction member generates friction forces between the roll cage and the hub which cause the roll cage to turn with the hub, thus placing the roll cage in the forward-engagement position.

While these existing systems are significant improvements over the prior art, there remains room for additional improvements.

SUMMARY OF THE INVENTION

A bi-directional overrunning clutch assembly is disclosed for engaging secondary driven shafts in a four wheel drive vehicle. The assembly includes a differential housing that has a differential case and a cover removably mounted to the case. A pinion input gear is rotatably disposed within case and includes a shaft that extends out from the case. The shaft is adapted to engage a drive shaft. The pinion input gear is rotatable within the case. A ring gear located within the differential case engages with the pinion input gear such that rotation of the pinion input gear produces rotation of the ring gear.

A bi-directional overrunning clutch housing is formed on or attached to the ring gear such that rotation of the ring gear produces corresponding rotation of the clutch housing. The clutch housing has an internal diameter with a contoured surface. The clutch housing also has a clutch pin extending outward from one side of the clutch housing. A pair of hubs are substantially coaxially aligned with each other and located within the clutch housing. Each hub is adapted to engage an end of a secondary driven shaft. A roll cage assembly is located within the clutch housing and includes a roll cage with two sets of rolls. Each roll is disposed within a slot formed in the roll cage. The rolls are spaced around the circumference of the cage. A plurality of springs are mounted to the roll cage for positioning the rolls in the slots. One set of rolls is located between a portion of the contoured surface of the clutch housing and an outer surface of one hub, and the other set of rolls is located between a portion of the contoured surface of the clutch housing and an outer surface of the other hub.

An electromagnetic system is included for indexing the roll cage relative to the clutch housing. The electromagnetic system includes first and second indexing devices for indexing the roll cage, and an electronic control system connected to each indexing device for activating the indexing devices. The first indexing device is configured, when activated, to cause the roll cage to rotate in a first direction relative to the clutch housing so as to index the roll cage into an active drive state where the rolls are positioned to cause the drive shaft to be coupled to the secondary driven shafts when four wheel drive is needed. The second indexing device is configured, when activated, to cause the roll cage to rotate in a second direction relative to the clutch housing that is opposite from the first direction so as to cause the roll cage to index into an active backdrive state where the rolls are positioned to cause the secondary driven shafts to be coupled to the drive shaft for providing torque transfer from the secondary driven shafts to the drive shaft during an engine braking condition.

In an embodiment, a spring assembly is included that is designed to bias the roll cage to a neutral position where the roll cage is not indexed. The spring assembly preferably includes a torsion spring disposed on a spring retainer. The torsion spring has a generally circular shape with ends that overlap. Each end includes an arm that extends at a generally right angle to where it attaches to the spring. The arms define a gap therebetween. The spring retainer includes a pin that extends out from one side of the retainer and into the gap, and the clutch pin on the clutch housing also extends into the gap with the arms on either side of the clutch pin.

Preferably at least one of the indexing devices is an electromagnetic coil assembly that includes a coil, and an armature plate that is engaged with the roll cage.

In one embodiment, the first indexing device includes a drive coil assembly attached to the differential housing at a location radially outward from one of the hubs. A first armature plate is disposed about the hub and adjacent to the drive coil assembly. The armature plate is engaged with the roll cage. The first drive coil assembly may be mounted to the cover on the differential housing.

The first armature plate may include a plurality of tangs which protrude toward the roll cage and engage with corresponding slots formed in the roll cage. The spring retainer may be disposed about the clutch housing and include a plurality of lugs that protrude from one side of the spring retainer and engage with slots formed in the first armature plate so that the spring retainer and the first armature plate rotate with the roll cage relative to the differential housing.

The second indexing device is preferably a backdrive coil assembly attached to the differential at a location radially outward from one of the hubs. A second armature plate is disposed about the same hub as the backdrive coil assembly and adjacent to the backdrive coil assembly. The second armature plate is preferably engaged with the roll cage. A hub plate is positioned between the backdrive coil assembly and the second armature plate. The hub plate is engaged with the same hub as the backdrive coil assembly so as to rotate in combination with that hub. The backdrive coil assembly is electrically connected to the electronic control system.

In one embodiment the hub that the second armature plate is disposed about is the same hub that the first armature plate is disposed about. In this embodiment, the second armature plate includes a plurality of tangs which protrude toward the roll cage. Each tang engages a slot in the roll cage so that the second armature plate is configured to rotate with the roll cage relative to the differential housing.

Preferably the first drive coil assembly and the backdrive coil assembly are both mounted to the cover on the differential housing, and the backdrive coil assembly is at a location radially inward from the first drive coil assembly.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE EMBODIMENTS

Figure 1:
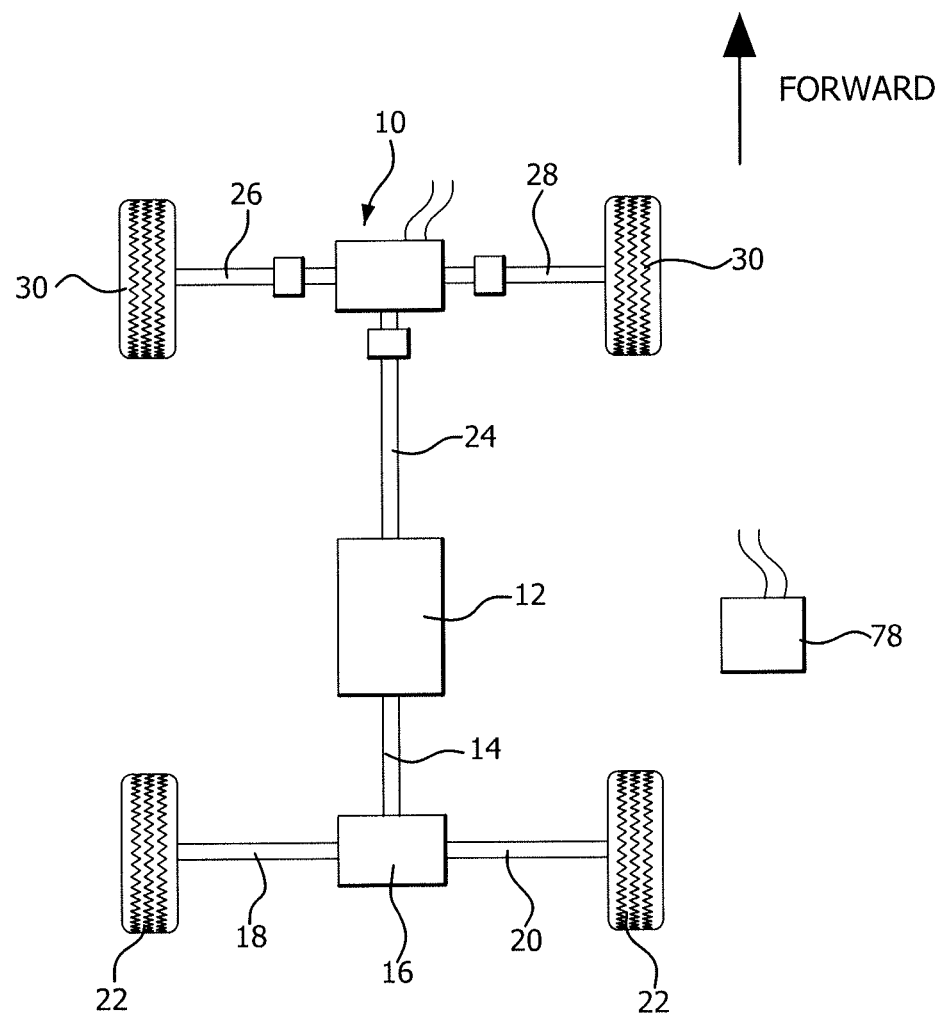
FIG. 1 is a schematic representation of one drive train embodiment in a vehicle incorporating the present invention.

Referring now to the drawings, wherein like reference numerals illustrate corresponding or similar elements throughout the several views, FIG. 1 is a schematic representation of one embodiment of a drive system incorporating a bi-directional overrunning clutch assembly 10 according to an embodiment of the present invention. The drive system includes a transmission 12, a primary drive shaft 14 a primary differential 16, and first and second primary driven shafts 18, 20 which drive primary wheels 22.

The drive system also includes a secondary drive shaft 24 which is rotatably connected to the bi-directional overrunning clutch assembly 10 through any conventional means known to those skilled in the art, such as a splined connection. The bi-directional overrunning clutch assembly 10, in turn, rotatably drives two secondary driven shafts 26, 28 which are attached to wheels 30.

Figure 2:
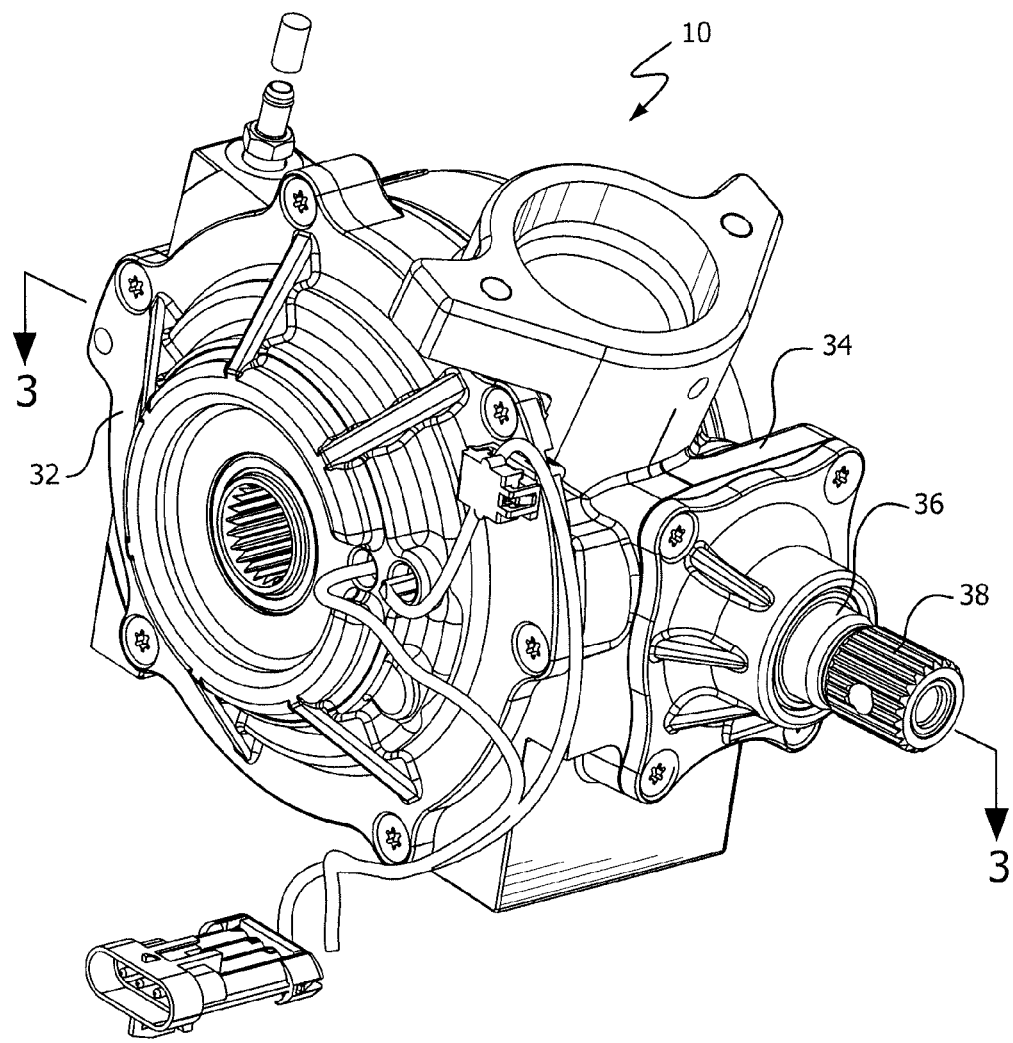
FIG. 2 is a perspective view of one embodiment of a bi-directional overrunning clutch according to the present invention.
Figure 3:
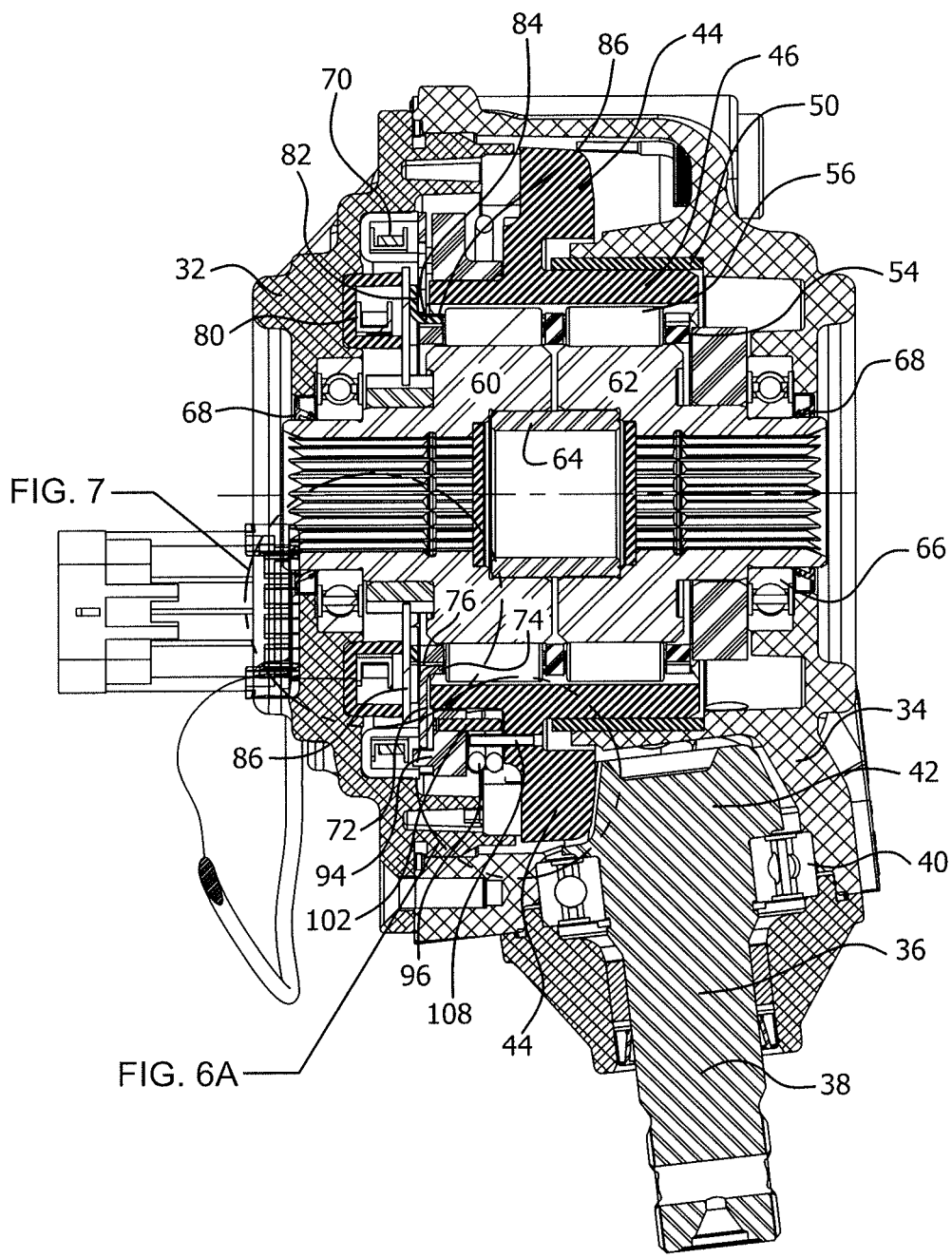
FIG. 3 is cross-sectional view of the bi-directional overrunning clutch of FIG. 2 taken along lines 3-3 in FIG. 2.
Figure 4:
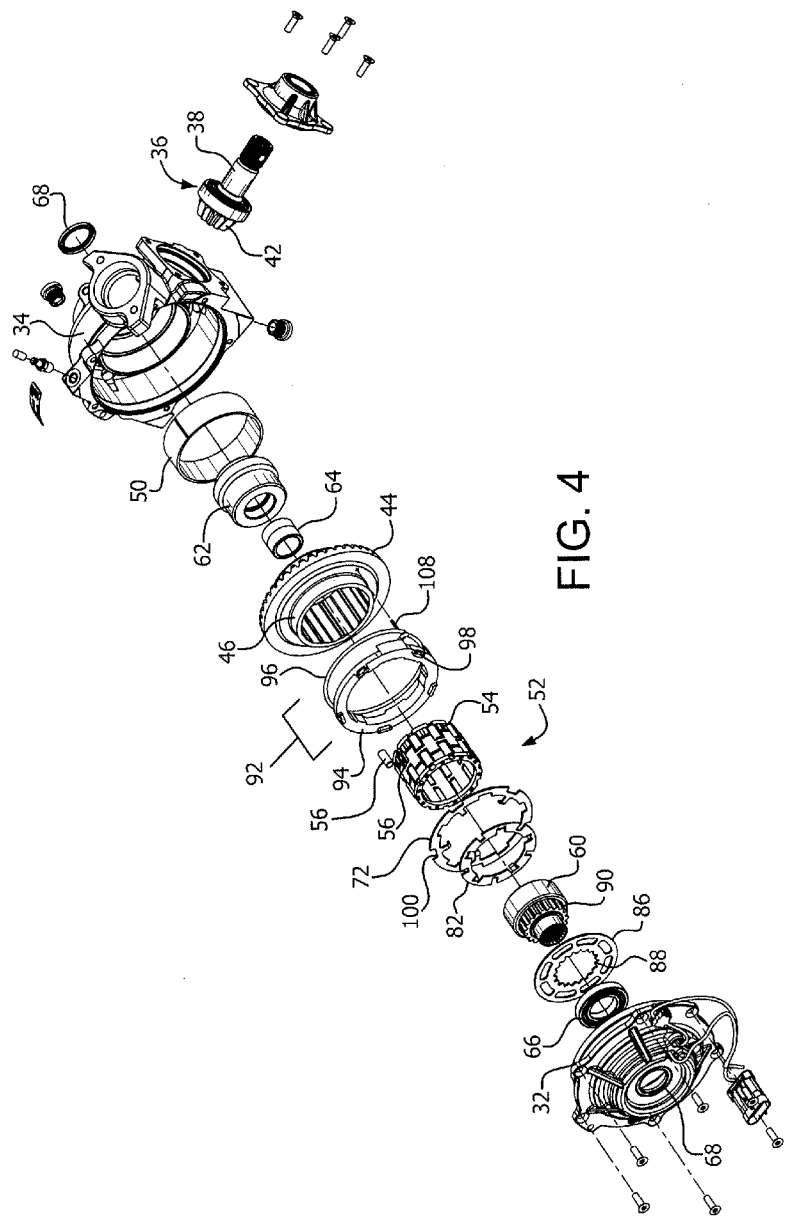
FIG. 4 is an exploded view of the bi-directional overrunning clutch shown in FIG. 2.

The details of the bi-directional overrunning clutch assembly will now be described with respect to FIGS. 2 through 12B. FIG. 2 is a perspective view of the bi-directional overrunning clutch assembly 10, including differential housing including a cover 32 removably mounted to a differential gear case 34. As shown, a pinion input gear 36 is rotatably disposed within case 34. A shaft 38 of the pinion input gear extends out from an opening in the case 34 and is adapted to attach to a drive shaft. For example, the secondary drive shaft 24 preferably engages with a splined end of a pinion input shaft 38. In order to facilitate rotation of the pinion input shaft 38, a bearing 40 is preferably mounted between the shaft 38 and the case 34. An oil seal is preferably located between the case and the pinion input shaft 38. The oil seal prevents oil from escaping out of the case.

The pinion input gear 36 preferably has a bevel gear 42 formed on or attached to the end of the shaft 38 within the differential case 34. The bevel gear 42 is preferably made from steel material. The bevel gear 42 engages with a ring gear 44 located within the differential case 34. The ring gear 44 is preferably made from steel with mating bevels. It is contemplated that other gearing arrangements, such as a worm gear set, may be used for engaging the pinion input shaft 38 to the ring gear 44.

The ring gear 44 is preferably formed integral with or attached to a clutch housing 46. The clutch housing 46 includes an internal diameter with a contour or cam surface 48. A bushing 50 is mounted between the clutch housing 46 and the differential case 34 for permitting the clutch housing 46 to freely rotate within the differential case 34. The bushing 50 is preferably a self-lubricating bushing, such as a DU bushing. A roller cage assembly 52 is located within the clutch housing 46 and includes a roll cage 54 with a plurality of rolls 56 rotatably disposed within slots 58 in cage 54. More specifically, the roll cage 54 preferably includes two independent sets of rolls 56 disposed within two sets of slots 58 formed in the roll cage 54 around its circumference. The roll cage 54 can be made from any suitable material that is sufficiently strong to withstand the applied loads, such as hardened anodized aluminum material or steel. Alternatively, the roll cage 54 can be made from plastic or composite material.

The rolls 56 are preferably made from hardened steel material. The roll cage assembly 52 includes a plurality of spring elements or clips 53 (FIG. 5A) for positioning the rolls 56 in the slots 58. A variety of springs can be used in the present invention. In one embodiment, each spring clip is preferably substantially H-shaped with two independent springs that are attached to or formed on opposite sides of a bridge. The bridge separates each spring into two opposed arms. The arms are preferably curved or arcuate in shape such that the combination of the arms is concave, similar to the shape of a leaf spring. However, the arms may also be linear such that they combine with the bridge to form a Y shape. The bridge acts as a yoke to support the arms permitting them to bend independently from one another, as well as from the opposite spring. Each slot 58 includes a spring from two adjacent spring clips, thus biasing the roller substantially into the center of the slot. The springs account for tolerances in the manufacturing of the various components so that the rollers all engage at the same time. Other spring mechanisms can be used in the present invention. U.S. Pat. Nos. 6,629,590, 6,622,837 and 6,722,484, which are incorporated herein by reference in their entirety, disclose spring arrangements and roll cage assemblies that can be used in the present invention.

Each set of rolls 56 is located adjacent to the inner cam surface of the clutch housing 46. In the illustrated embodiment, one configuration of the contour of the cam surface is shown in more detail in FIGS. 5A through 5D and is configured with a plurality of peaks and valleys. When the roll cage 54 is located within the clutch housing 46 and the clutch is not activated, the rolls 56 are located within the valleys with the cam surface tapering toward the cage on either side of the roll 56. The cam surface and rolls 56 provide the bi-directional overrunning capabilities as described in detail in U.S. Pat. Nos. 6,629,590, 6,622,837 and 6,722,484. Cam surfaces and roll cages in overrunning clutches are well known in the art. Hence, a detailed discussion of these features is not needed.

There are two hubs 60, 62, which include a portion located radially inward of the roll cage 54. Each hub is adjacent to one of the sets of rolls 56 such that the outer surface of a portion of each hub contacts a set of rolls 56. As is well understood in the art, the contact between the rolls 56, the clutch housing 46 and the hubs 60, 62 transfer rotation between the clutch housing and the axles. A bushing 64 is preferably located between the inner ends of the two hubs 60, 62.

Each hub is engaged with a corresponding axle 26, 28 though any conventional means designed to transfer torque from the hub to the axle. In the illustrated embodiment, each hub includes internal splines which mate with external splines on a portion of the axles. It is contemplated that the hubs and axles could be formed as integral units if desired. The internal splines on the hubs are accessible through openings formed in the cover 32 and gear case 34. A roller bearing 66 is mounted between a portion of each hub 60, 62 and the corresponding cover 32 or case 34. The roller bearing 66 supports the hub while permitting the hub to rotate with respect to the cover/case. An oil seal 68 is preferably incorporated into the cover 32 and case 34 around the hub 60, 62 to provide a fluid tight seal between the two components.

Figure 5A:
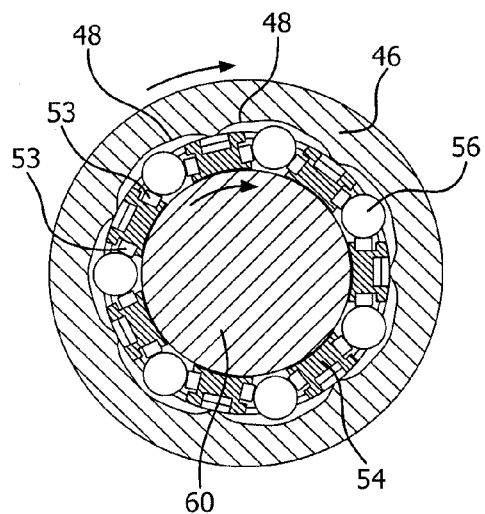
FIG. 5A is a schematic cross-sectional view of a roll cage assembly in a non-active state.
Figure 5B:
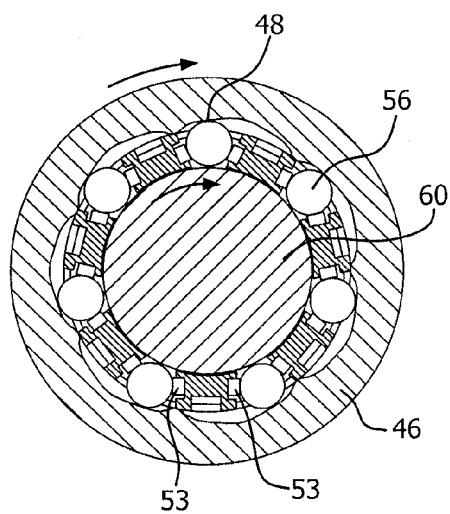
FIG. 5B is a schematic cross-sectional view of the roll cage assembly in its active drive state but the hubs are not engaged to the clutch housing.

As discussed briefly above, the engagement of the rolls 56 with the clutch housing 46 and hubs 60, 62 permits the transfer of torque from the secondary drive shaft 24 to the secondary driven shafts 26, 28. In order to activate the overrunning clutch and thereby making the vehicle capable of engaging in four wheel drive and engine braking, the present invention preferably incorporates an electromagnetic system. More specifically, the present invention includes two or more roll cage adjustment devices or indexing devices which are electrically connected to an electronic control system. Each adjustment device preferably includes an electromagnetic coil assembly. The first indexing device (e.g., the electronic or electromagnetic drive activation device or electromagnetic drive coil assembly) is configured, when activated, to cause the roll cage to index into an active drive state (i.e., four wheel drive capability) where the rolls are positioned to cause the secondary drive shaft 24 be coupled to the secondary driven shafts 26, 28 when four wheel drive is needed. This is shown in FIG. 5B and will be discussed further below.

Figure 5C:
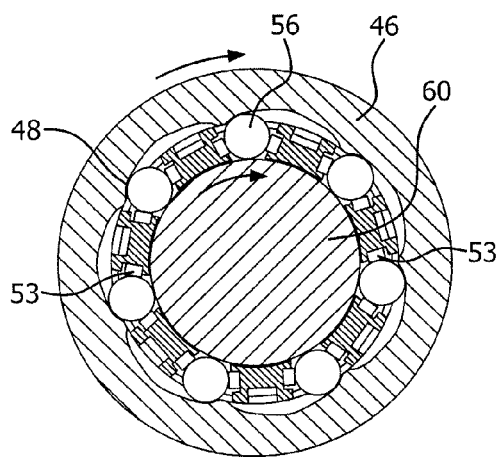
FIG. 5C is a schematic cross-sectional view of the roll cage assembly in its active drive state with the hubs engaged to the clutch housing for providing torque transfer.
Figure 5D:
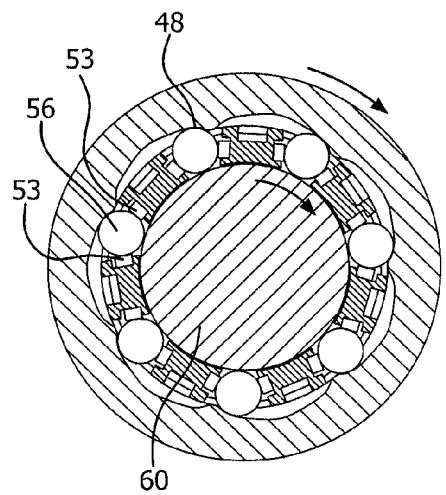
FIG. 5D is a schematic cross-sectional view of the roll cage assembly in an activated engine braking state with the hubs engaged to the clutch housing for providing torque transfer from the hubs to the clutch housing.
Figure 6B:
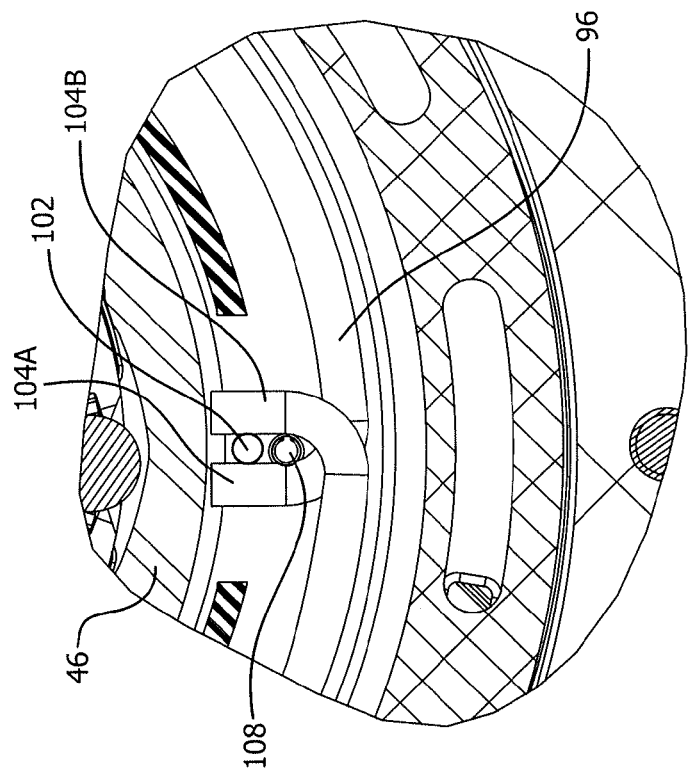
FIG. 6B is an enlarged view of the pinned connection taken along lines 6B-6B in FIG. 6A.
Figure 6A:
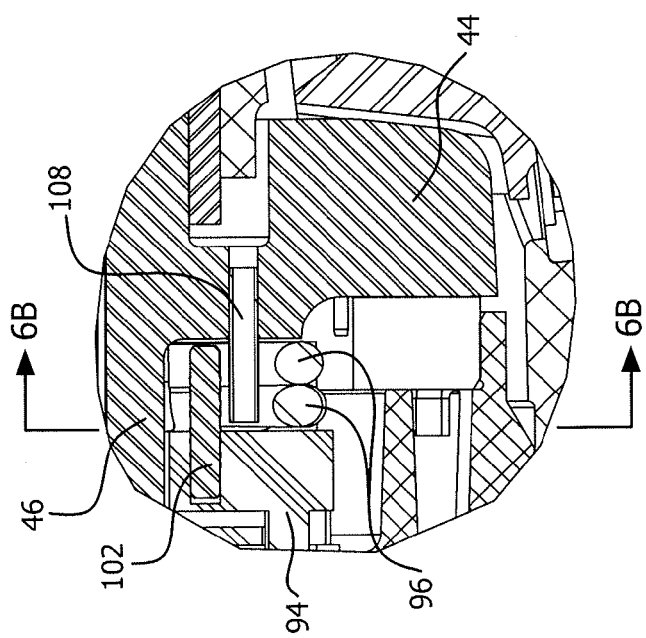
FIG. 6A is an enlarged view from FIG. 3 of the pinned connection of the torsion spring.
Figure 7:
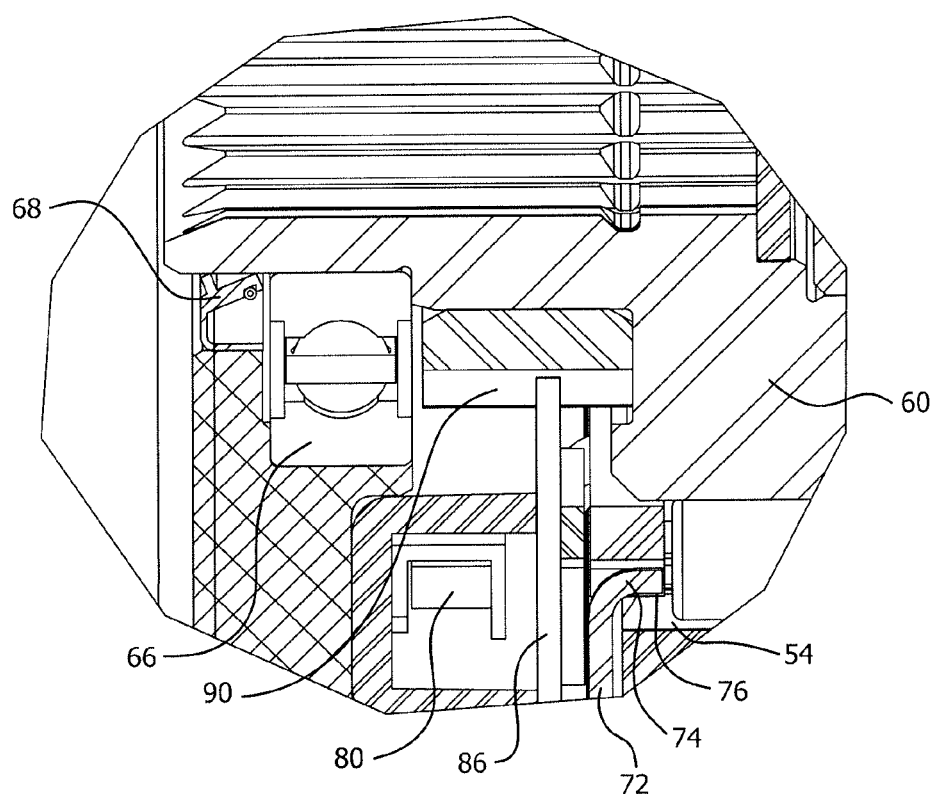
FIG. 7 is an enlarged view from FIG. 3 showing the second coil, hub plate and the first armature plate.
Figure 8:
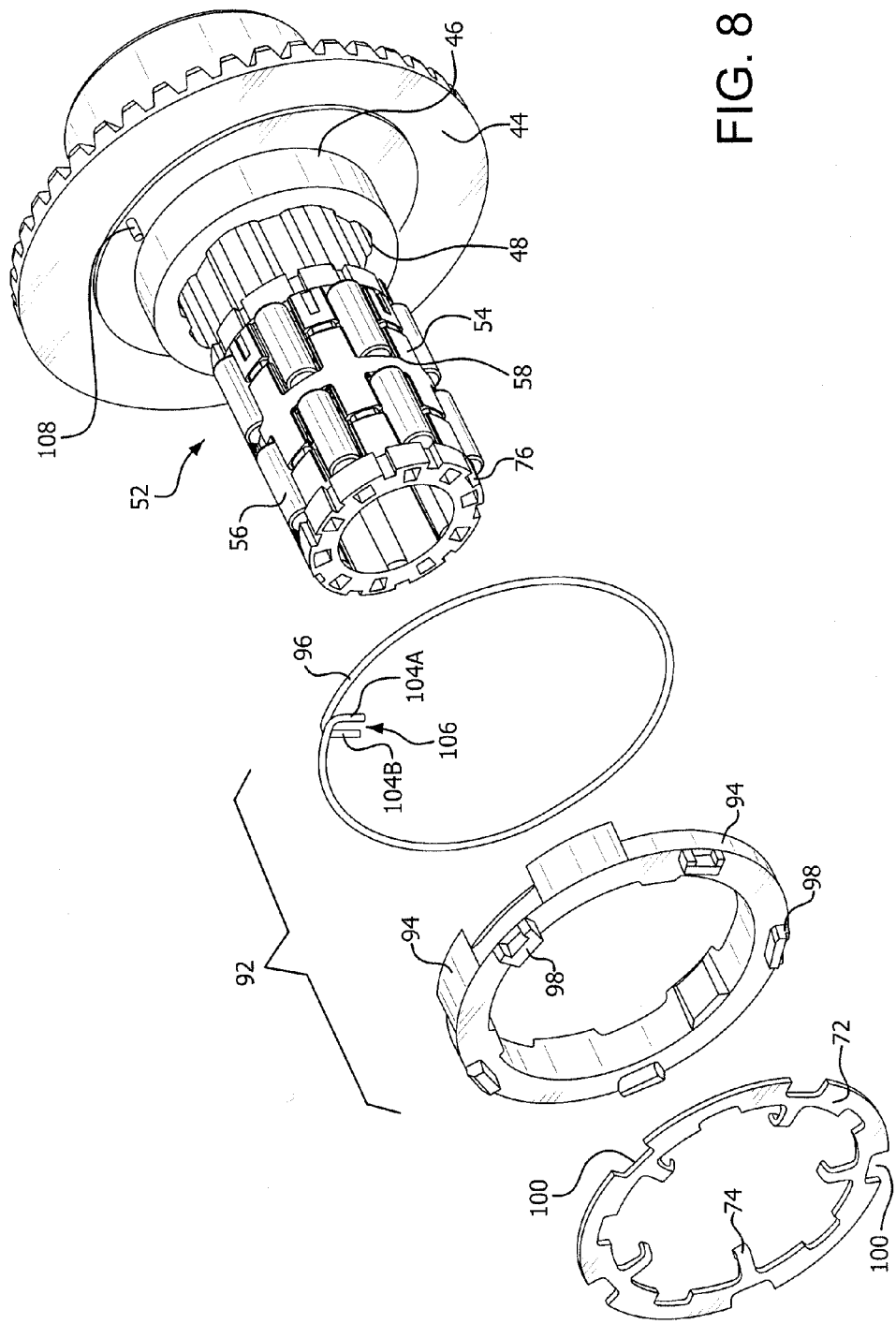
FIG. 8 is an exploded perspective view of one embodiment of a torsion spring assembly according to the present invention.
Figure 9:
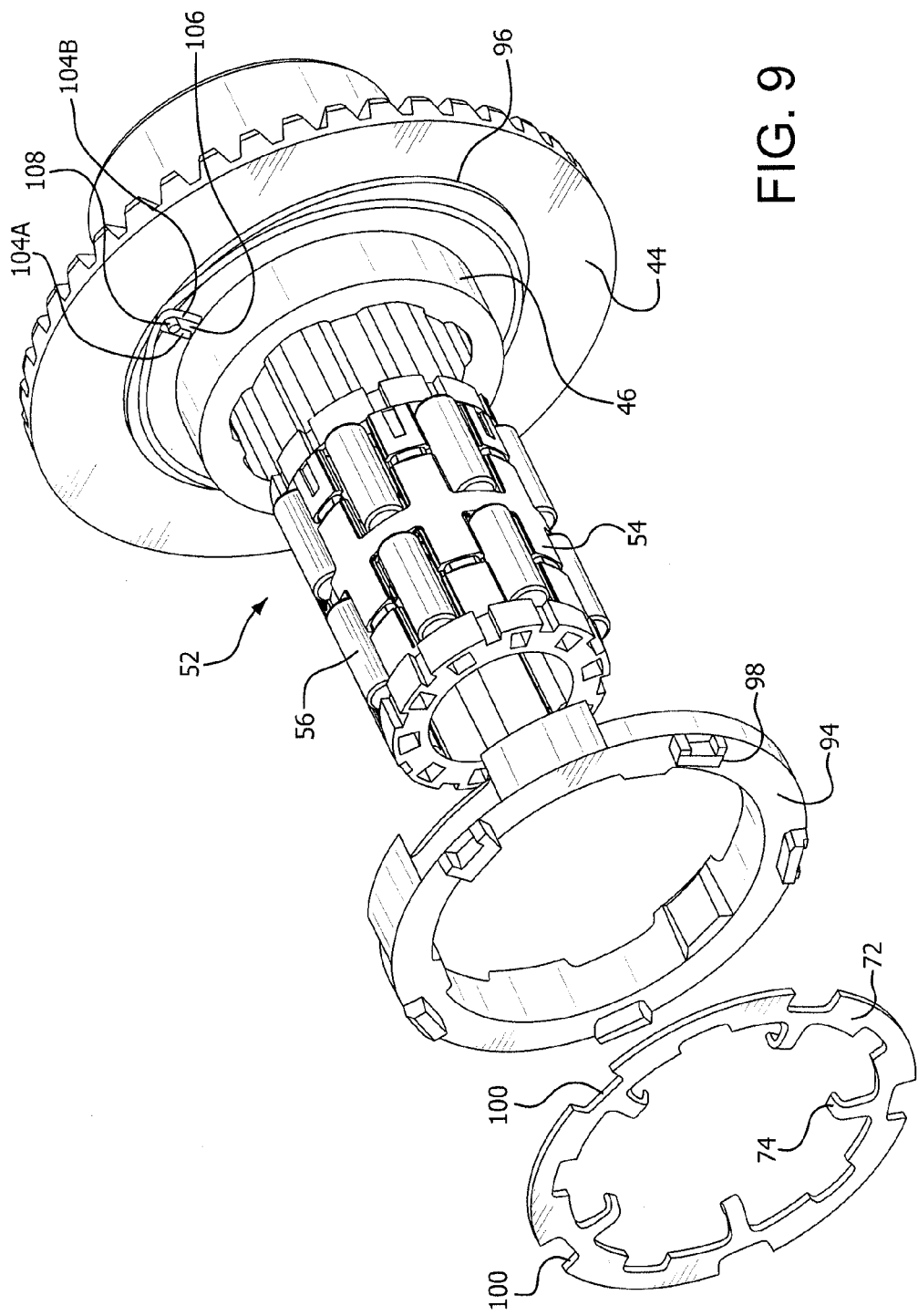
FIG. 9 is the torsion spring assembly of FIG. 8 with the torsion spring mounted to the clutch housing.
Figure 10:
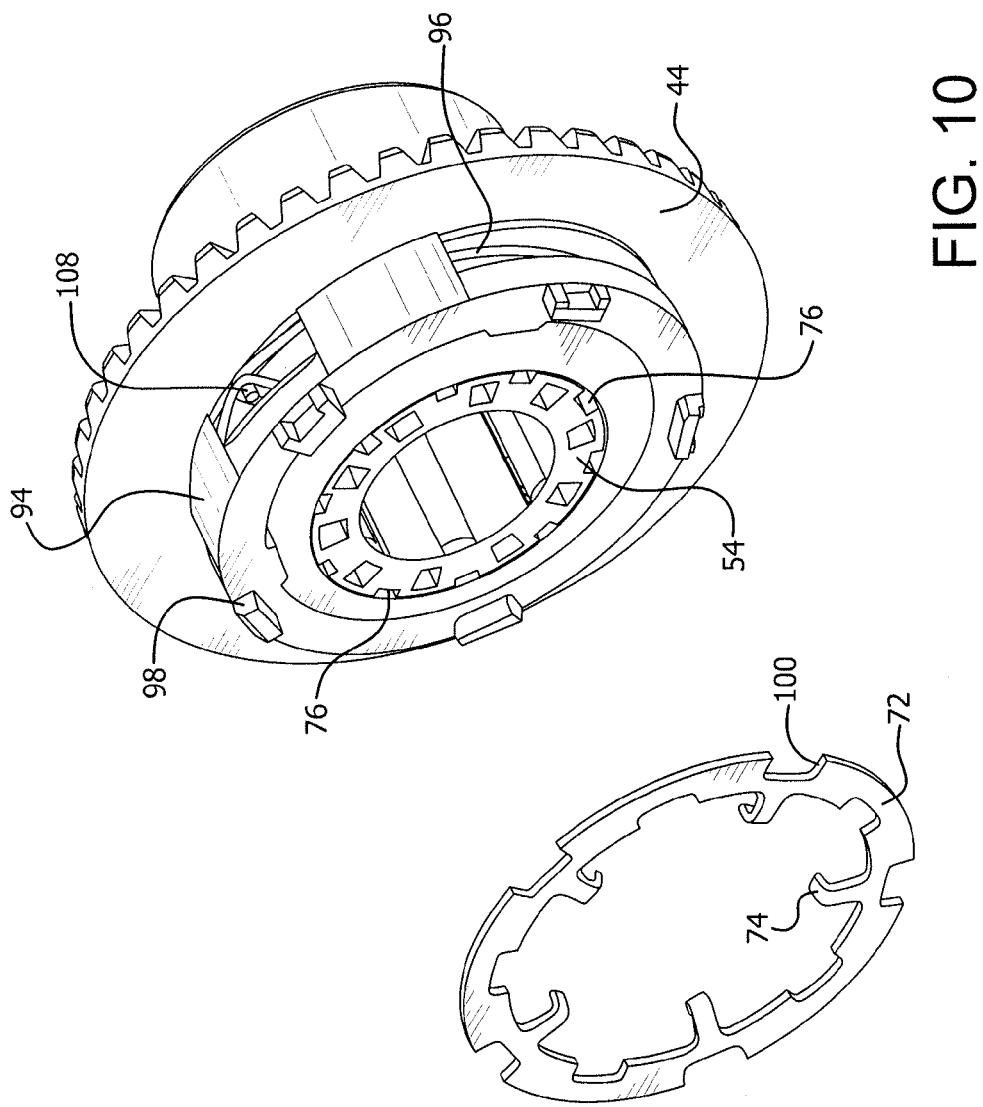
FIG. 10 is the torsion spring assembly of FIG. 8 partially assembled.
Figure 11:
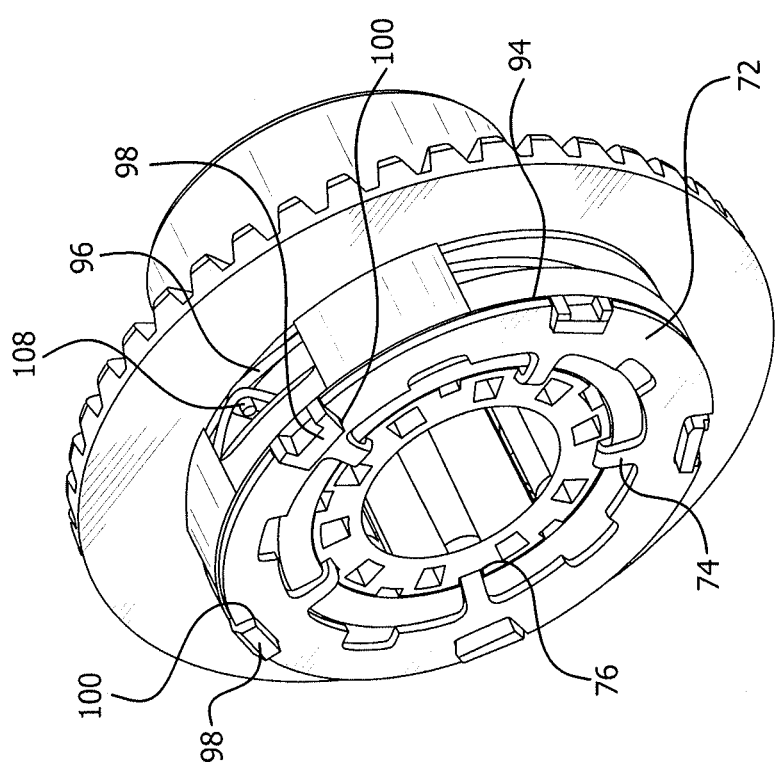
FIG. 11 is the torsion spring assembly of FIG. 8 fully assembled.
Figure 12A:
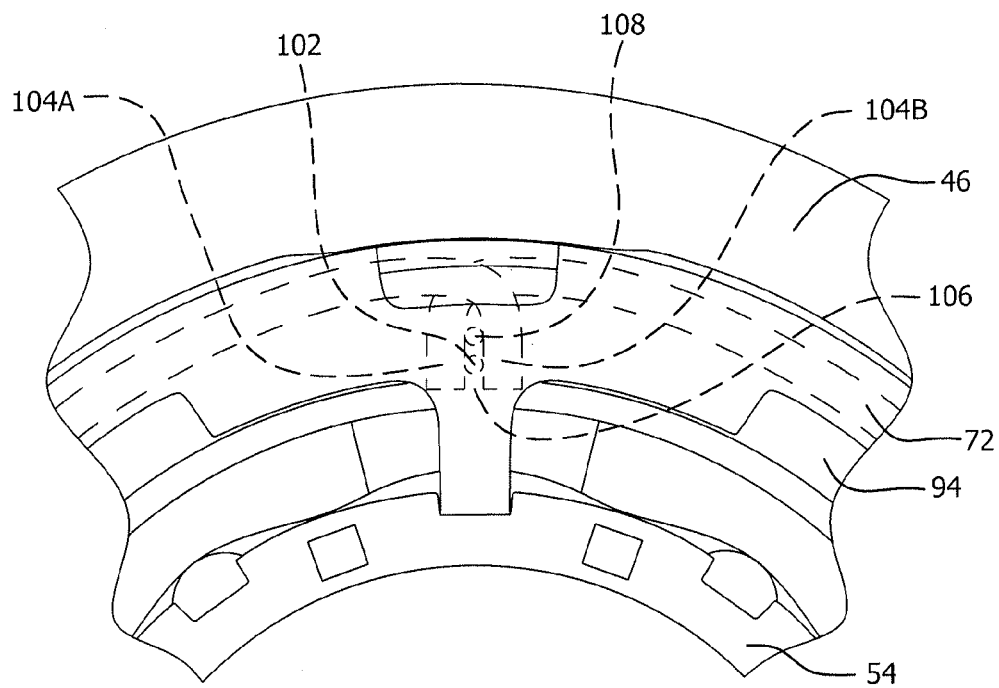
FIG. 12A is an enlarged view of a portion of the assembled torsion spring assembly of FIG. 11 in its neutral position.
Figure 12B:
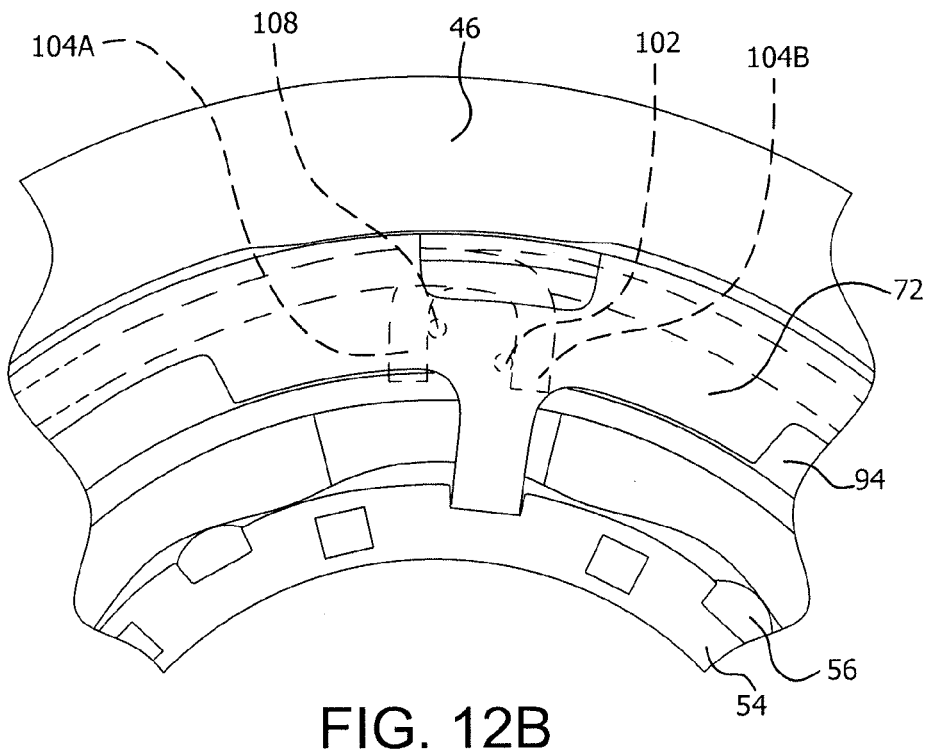
FIG. 12B is an enlarged view of a portion of the assembled torsion spring assembly of FIG. 11 in its activated position.

The second indexing device (e.g., the electromagnetic backdrive activation device or electromagnetic backdrive coil assembly) is configured, when activated, to cause the roll cage to index into an active backdrive state (i.e., engine breaking capability) where the rolls are positioned to cause the secondary driven shafts 26, 28 to be coupled to the secondary drive shaft 24 for providing torque transfer from the secondary driven shafts 26, 28 to the secondary drive shaft 24 during an engine braking condition. This is shown in FIG. 5D and will also be discussed further below. As discussed below, the second indexing device is activated when the vehicle is decelerating or on a downhill.

In one embodiment, each electromagnetic indexing device includes a coil assembly that includes a coil in an annular steel coil pocket or housing and an armature plate which control retarding or indexing of the roll cage 54 with respect to the clutch housing 46. The first indexing device includes a drive coil assembly 70 that is preferably attached to the cover 32 at a location radially outward from the hub 60. The drive coil assembly 70 is preferably annular in shape with a central axis coincident with the axis of rotation of the roll cage 54. The drive coil assembly 70 is preferably a bobbin wound coil which includes a plastic base about which the coil is wound. Suitable coils for use in the present invention are well known to those skilled in the electric clutch art. The drive coil assembly 70 is preferably bonded or otherwise attached to the cover 32.

A first armature plate 72 is located between the drive coil assembly 70 and the roll cage 54. The armature plate 72 is preferably annular in shape and is free to rotate with respect to the drive coil assembly 70 when the coil is not energized. The armature plate 72 includes at least one and, more preferably a plurality of tangs or fingers 74 which protrude from the armature plate 72 toward the roll cage 54. The tangs 74 engage with slots 76 formed in the roll cage 54. The armature plate 72 is engaged with the roll cage 54 when the tangs 74 are engaged with the slots 76. Hence, when the drive coil assembly 70 is not energized, the armature plate 72 rotates with the roll cage 54 relative to the clutch housing 46. The armature plate 72 is preferably made from steel material. While a separate armature plate 72 has been described above, it is also contemplated that armature plate can be attached to, formed on, or engaged with the roll cage 54 so as to rotate in combination with the roll cage 54. Alternately, the armature plate 72 can be permanently or removably attached to the roll cage 54, or may simply be a surface on the roll cage 54.

When the drive coil assembly 70 is energized, an electromagnetic field is generated between the drive coil assembly 70 and the armature plate 72 attracting the armature plate 72 to the drive coil assembly 70, thus causing it to drag. Since the armature plate 72 is engaged with the roll cage 54 by the tangs 74, the dragging of the armature plate 72 causes the roll cage 54 to also drag or retard. In an alternate embodiment (not shown), instead of tangs 74 on the armature plate 72 engaging with slots 76, the roll cage 54 includes protrusions that engage with slots in the armature plate 72.

The drive coil assembly 70 is connected to an electronic control system, such as a signal processor or manually activated electrical system, for controlling the energizing of the coils. Other types of control systems can also be used in the present invention. (The electronic control system is generally identified by the numeral 78 in FIG. 1 and described in more detail below.)

The second indexing device includes a backdrive coil assembly 80 that is preferably attached to the cover 32 at a location radially outward from the hub 60 but inward from the drive coil assembly 70. The backdrive coil assembly 80 is preferably similar to the drive coil assembly 70 and is annular in shape with a central axis coincident with the axis of rotation of the roll cage 54. The backdrive coil assembly 80 is preferably bonded or otherwise attached to the cover 32.

A second armature plate 82 is located between the backdrive coil assembly 80 and the roll cage 54. The second armature plate 82 is preferably annular in shape and is free to rotate with respect to the backdrive coil assembly 80 when the coil is not energized. The second armature plate 82 includes at least one and, more preferably a plurality of tangs or fingers 84 which protrude from the second armature plate 82 toward the roll cage 54. The tangs engage with slots 76 formed in the roll cage 54. The second armature plate 82 is engaged with the roll cage 54 when the tangs 84 are engaged with the slots 76. Hence, when the backdrive coil assembly 80 is not energized, the second armature plate 82 rotates with the roll cage 54 relative to the clutch housing 46. The second armature plate 82 is preferably made from steel material. As with the first armature plate 72, the second armature plate 82 can be engaged to the roll cage 54 in other manners. For example, while the second armature plate 72 has been described above as a separate component from the roll cage 54, it is also contemplated that second armature plate can be attached to, formed on, or engaged with the roll cage 54 so as to rotate in combination with the roll cage 54. Alternately, the second armature plate 82 can be permanently or removably attached to the roll cage 54, or may simply be a surface on the roll cage 54. It is also contemplated that a single armature plate can be used in the present invention with two independently controlled coil assemblies mounted in a common cover or housing. It is also contemplated that two armature plates could be interlocking with drive feature(s) but only one of the armature plates is interacting with the roll cage.

A hub plate 86 is positioned between the backdrive coil assembly 80 and the second armature plate 82. The hub plate 86 is engaged with the hub 60. Specifically the hub plate 86 is annular in shape and includes, in one preferred embodiment, teeth 88 around an inner diameter that engage with splines 90 formed on an outer surface of the hub 60. Thus, the hub plate 86 is configured to rotate in combination with the hub 60. Other mechanisms can be used to engage the hub plate 86 to the hub 60. An upper portion of the hub plate 86 is located adjacent to the backdrive coil assembly 80 and the second armature plate 82.

When the backdrive coil assembly 80 is energized, an electromagnetic field is generated between the backdrive coil assembly 80, the hub plate 86 and the second armature plate 82 attracting the hub plate 86 and second armature plate 82 to the backdrive coil assembly 80. Since the hub plate 86 is coupled to the hub, the activation of the backdrive coil assembly magnetically holds the second armature plate 82 to the hub thus causing it to want to rotate with the hub. Since the second armature plate 82 is engaged with the roll cage 54 by the tangs 84, the magnetic engagement of second armature plate 82 causes the roll cage 54 to advance relative to the clutch housing 46 as the hub 60 rotates. The backdrive coil assembly 80 is also connected to the electronic control system 78.

While the first and second indexing systems are described above as including coil assemblies, it is also contemplated that other electronically controlled assemblies can be used. For example, an electrically controlled solenoid could be used to cause the indexing. In this embodiment, the solenoid would be activated by the electronic control system so as to cause a plunger to engage the armature plate, hub plate, and/or a surface on the roll cage to produce the necessary frictional contact for dragging the roll cage into its indexed position. Other systems, such as hydraulic and pneumatic actuators can be used in place of the coils and similarly controlled by the electronic control system. A person skilled in the art, in light of the teachings provided in this description, would be readily capable of implementing such systems into the clutch system shown.

The indexing systems above are configured to move the roll cage 54 in a prescribed direction relative to the clutch housing when a certain state of operation is desired (four wheel drive or engine braking). When those states are no longer desired, the system includes a spring assembly, such as a torsion spring assembly 92 for biasing the roll cage 54 back to its neutral position. The torsion spring assembly 92 includes a spring retainer adapter 94 which, as will be discussed below, provides a connection between a torsion spring 96 and the first armature plate 72. However, as will become apparent, the adapter 94 could alternately be connected to the second armature plate 82. The adapter 94 is an annular ring that is disposed about an outer surface of the clutch housing 46. One side of the adapter 94 is located adjacent to a portion of the first armature plate 72. In one embodiment the adapter 94 has at least one and more preferably a plurality of protruding lugs or tabs 98 that extend out of the side of the adapter 94 facing the first armature plate 72. The lugs 98 mate with notches 100 formed in the first armature plate 72. This is shown in FIGS. 8-11. The mating of the adapter 94 with the armature plate 72 provides a connection between the adapter 94 and the roll cage 54 (which is engaged with the armature plate through the tabs 74.)

The adapter 94 includes an adapter pin 102 (FIG. 3) that protrudes out of the side of the adapter 94 opposite from the armature plate 72.

The torsion spring 96 is generally circular in shape with its ends overlapping. The spring 96 is also disposed about the outer surface of the clutch housing 46 and adjacent to the adapter 94. The torsion spring 96 is designed to bias the roll cage 54 to its neutral position (with the rolls centered in the cam surface). The overlapping ends of the torsion spring 96 each include an arm 104 that extends at a generally right angle to where it extends from the spring. The ends of the torsion spring overlap such that the arms 104 on the torsion spring 96 extend past one another defining a gap 106. A clutch pin 108 extends outward from the clutch housing 46 and is captured in the gap 106 with the arms 104 on either side of the clutch pin 108. The arms 104 are also on either side of the adapter pin 102 which is located adjacent to the clutch pin 108. See, FIGS. 12A-12B. Thus, the adapter 94 acts to retain the torsion spring 96 on the clutch housing 46.

When the first indexing device is energized it hinders the rotation of the armature plate 72, thus hindering the roll cage 54 and adapter 94. This causes the adapter pin 102 to move one of the spring arms 104A away from the other spring arm 104B (which is held stationary by the clutch pin 108.) See, FIG. 12B. This movement causes the torsion spring 96 to deflect at which point the spring force of the torsion spring acts against the adapter pin 102 to bias it back toward the clutch pin 108 and the neutral position of the roll cage.

The incorporation of a torsion spring provides much tighter tolerance and provides a reliable mechanism for returning the roll cage 54 to its neutral position, preventing unwanted wedging of the rolls between the cam surface and the hub. The torsion spring 96 also prevents premature engagement that could potentially occur in some designs. Also, the use of a torsion spring 96 reduces the need for the roll springs to be designed to bias the roll cage into a neutral position. Thus, the operational life of the roll springs is increased. Other types of spring assemblies can be used in the present invention. For example, one or more springs could be mounted between the roll cage and the clutch housing (one end of the spring on the housing the other on the roll cage) for biasing the roll cage into its neutral position from an indexed position. Two springs can be used, each biasing the roll cage in the opposition position. In this embodiment a spring adapter is not needed. If a spring adapter is used, the springs could be mounted between the adapter and the roll cage.

The operation of the bi-directional overrunning clutch will now be discussed. Under normal operation (two-wheel drive mode), the electronic control system 78 does not send any signals to energize the coil assemblies. Accordingly, the vehicle is propelled by the primary drive shaft 14 and primary driven shafts 18, 20. The secondary drive shaft 24 rotates the pinion input shaft 38 which drives the ring gear 44. The ring gear 44 rotates the clutch housing 46 within the differential case 34. Since the coils are not energized, the torsion spring assembly 92 maintains the roll cage 54 in a relatively central or unengaged position (non-activated position). This position is best illustrated in FIG. 5A. In this position, the rolls 56 are not wedged between the hubs and the tapered portions of the cam surface of the clutch housing 46 and, therefore, there is no driving engagement between the clutch housing 46 and the hubs 60, 62. Instead, the rolls 56 and roll cage 54 rotate with the clutch housing 46, independent from the hubs. In this mode of operation, the secondary driven shafts 26, 28 do not drive the wheels but, instead, are driven by the wheels 30.

When it is desired to operate the vehicle such that four wheel drive is available when needed (four-wheel drive capability mode or on-demand), the electronic control system 78 is activated. Preferably, the activation is provided by manually actuating a button on the vehicle console, although the system can be automatically activated if desired. The electronic control system 78 sends a signal to energize the first or drive coil assembly 70. (The second coil 80 is not energized in this mode of operation.) As discussed above, the energizing of the drive coil assembly 70 creates an electromagnetic field between the drive coil assembly 70 and the first armature plate 72 which indexes the roll cage 54, thereby placing the rolls in position to wedge when needed. See FIG. 5B. It should be apparent that if other electronically controlled assemblies are used instead of the coil assemblies, the electronic control system would control those in an appropriate manner. The rolls 56 are located near to but not wedged between the tapered portion of the cam surface and the hubs 60, 62. Instead, the difference in rotational speed between the secondary drive shaft 24 and the secondary driven shafts 26, 28 maintains the rolls 56 in an overrunning mode. As such, the vehicle continues to operate in two-wheel drive (i.e., driven by the primary drive shaft 14).

When the wheels 22 driven by the primary drive shaft 14 begin to slip, the rotational speed of the secondary drive shaft 24 and the output shafts 26, 28 begin to equalize relative to the ground (assuming the output shafts 26, 28 are configured so as to be underpowered), since ground speed controls four-wheel drive and overrunning engagement. As such, the clutch housing 46 starts to rotate faster than the output shafts 26, 28 and hubs 60, 62. This change in relative speed between these components causes the rolls 56 to wedge between the hubs and the tapered portion of the cam surface (as shown in FIG. 5C). As a result, torque is transmitted from the clutch housing 46 to the hubs and the vehicle is now operating in four-wheel drive (i.e., the primary driven shafts 18, 20 and secondary driven shaft 26, 28 are driving the wheels 22, 30). The drive system will stay in four-wheel drive until the wheels 22 on the primary drive shaft 14 stop slipping, at which point the output shafts 26, 28 once again overrun the clutch housing 46 and rolls 56 disengage. The ability of the present invention to engage and disengage the secondary driven shafts when needed allows the system to provide immediate four-wheel drive capability in both forward and rear directions.

Another feature of the bi-directional overrunning clutch 10 according to the present invention is that, even when the vehicle is operating in four-wheel drive capability mode, i.e., when torque is transmitted to the secondary driven shafts 26, 28, the sets of rolls 56 can independently disengage (overrun) from the clutch housing 46 when needed, such as when the vehicle enters into a turn and the wheel on one secondary driven shaft 26 rotates at a different speed than the wheel on the other secondary driven shaft 28. As such, the overrunning clutch 10 provides the drive system with the advantages of an open differential in cornering without traction loss, and the advantages of a locking differential when in four-wheel drive.

The present invention also provides engine braking capability (backdriving mode) for use when driving the vehicle down steep inclines. In the backdriving mode, the secondary driven shafts 26, 28 are engaged with the secondary drive shaft 24 and actually drive the secondary drive shaft 24. This is important since the front wheels generally have better traction than the rear wheels when the vehicle is descending down a steep slope in a forward direction. The present invention takes advantage of this occurrence and engages the front wheels (via the secondary driven shafts 26, 28) with the secondary drive shaft 24 (via the clutch housing 46 and pinion input shaft 38) such that front wheels control the rotation of the secondary drive shaft 24. This produces engine braking, thereby assisting in slowing down the vehicle.

The backdriving mode is preferably controlled by a throttle position sensor that is part of the electronic control system 78. The throttle position sensor is designed such that, when the clutch assembly is in its drive state, the vehicle will be in four wheel drive when the throttle is depressed. When the throttle is released and the vehicle begins to decelerate, the electromagnetic backdrive coil assembly is automatically energized (and preferably the electromagnetic four wheel drive coil assembly deenergized) placing the clutch assembly in the backdrive mode. It is contemplated that one skilled in the art could use other means to sense when backdrive is needed, such as a traction sensor, and then send a signal to the electronic control system 78 when backdriving is needed. Alternatively, the electromagnetic backdrive coil assembly could be manually engaged by the operator of the vehicle by depressing a button on the vehicle console which sends a signal to the electronic control system 78 to energize the backdrive coil assembly 80. (Preferably the drive coil assembly 70 is not energized in this mode.) This creates a magnetic field that causes the second armature plate 82 to magnetically engage with the hub plate 86. Since the driven shafts 26, 28 are rotating faster than the clutch housing 46, this causes the roll cage 54 to advance relative to the housing 46. This results in the rolls 56 becoming wedged between the hubs and the tapered portion of the cam surface on the clutch housing 46 (as shown in FIG. 5D). As such, the wheels 30 on the secondary driven shafts 26, 28 are directly connected to the secondary drive shaft 24 and become the input to the gear box locking the entire gear train together. In this mode, both front wheels are engaged, but unlike a locked front drive the front inside wheel is allowed to under-run in a turn, thus allowing for speed differentiation between the two output hubs.

When in the backdriving mode, when the vehicle is no longer descending the hill, the speed of the driven shafts 26, 28 will decrease below the speed of the clutch housing 46. Since the backdrive coil assembly is still energized, it will (in combination with the bias of the torsion spring 96) drag roll cage 54 toward its neutral position, but not limited to staying in the neutral position. The configuration of the system also allow to under-run in the backdrive mode. That is, if a wheel is rotating at less than ground speed, the advancing of the roll cage 54 permits the rolls to disengage so as to permit the slower wheel to not drive the system. The unique construction of the overrunning clutch according to the present invention permits it to be used in a vehicle with or without power steering. While power steering provides advantages in a drive system that includes the bi-direction overrunning clutch, it is not a necessity.

The control system is preferably configured to shut off (deactivate) the first indexing system when second indexing system is activated so as to prevent the two indexing systems from fighting each other. This, however, is not needed in all applications, for example if the second indexing system provides significantly higher drag than the first indexing system.

While one preferred embodiment of the invention has been described with coils and armature plates as the roll cage adjustment devices, as discussed above, those skilled in the art, in light of the teachings provided herein, would understand how to modify the invention to incorporate other electrically controlled assemblies, such as mechanical, electrical, hydraulic or pneumatic devices in place of the coils and/or armature plates as components in the indexing devices.

As should be apparent from the above description, the present invention provides an innovate bi-directional overrunning clutch assembly that is useful in a switchable four-wheel drive system (i.e., a system that can be switched from a two-wheel drive system to a four-wheel drive system depending on need.)

It is also contemplated that the cam surface need not be formed on the clutch housing but, instead, can be formed on the races. Also, the roller clutch described above can be easily modified to use sprags instead of rolls. A person skilled in the art could readily make these substitutions in light of the above teachings.

Also, the present invention has applicability for controlling drive and driven shafts in other assemblies. For example, in a transmission, the present invention could be used to control torque transfer (turn on and off) the front or rear drive shaft. The present invention could also be used as a 4×4 disconnect and still have the ability to engine brake. In this set up, the system would only require use of the second indexing system with the second armature plate and hub plate, without need for the first indexing system. Similarly, if the present invention is used as a primary drive system, where torque is continuously driven to the primary drive shafts, the present invention could be used within the first indexing system.

As used herein, the term "engage" is intended to both direct physical engagement through one or more components as well as operative engagement.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

The invention claimed is:

1. A bi-directional overrunning clutch assembly for engaging secondary driven shafts in a four wheel drive vehicle, the assembly comprising:
   a differential housing including a differential case and a cover removably mounted to the case;
   a pinion input gear rotatably disposed within case and including a shaft extending out from the case and adapted to engage a drive shaft, the pinion input gear rotatable within the case;
   a ring gear located within the differential case and engaged with the pinion input gear such that rotation of the pinion input gear produces rotation of the ring gear;
   a bi-directional overrunning clutch housing formed on or attached to the ring gear such that rotation of the ring gear produces corresponding rotation of the clutch housing, the clutch housing having an internal diameter with a contoured surface a pair of hubs substantially coaxially aligned with each other and located within the clutch housing, each hub adapted to engage an end of a secondary driven shaft;
   a roll cage assembly located within the clutch housing and including a roll cage with two sets of rolls, each roll disposed within a slot formed in the roll cage, the rolls spaced around the circumference of the cage, and a plurality of springs for positioning the rolls in the slots, wherein one set of rolls is located between a portion of the contoured surface of the clutch housing and an outer surface of one hub, and the other set of rolls is located between a portion of the contoured surface of the clutch housing and an outer surface of the other hub;
   an electromagnetic system for indexing the roll cage relative to the clutch housing, the electromagnetic system including first and second indexing devices for indexing the roll cage, and an electronic control system connected to each indexing device for activating the indexing devices;
   the first indexing device configured when activated to cause the roll cage to index in a first direction relative to the clutch housing so as to index the roll cage into an active drive state where the rolls are positioned to cause the drive shaft to be coupled to the secondary driven shafts when four wheel drive is needed; and
   the second indexing device configured when activated to cause the roll cage to rotate in a second direction relative to the clutch housing that is opposite from the first direction so as to cause the roll cage to index into an active backdrive state where the rolls are positioned to cause the secondary driven shafts to be coupled to the drive shaft for providing torque transfer from the secondary driven shafts to the drive shaft during an engine braking condition, the second indexing device including an electronically controlled assembly, and a hub plate engaged with one of the hubs so as to rotate in combination with that hub, wherein the electrically controlled assembly is configured, when activated, to cause the hub plate to engage with the roll cage so as to index the roll cage in the second direction.

2. The bi-directional overrunning clutch assembly of claim 1, further comprising a spring assembly configured to bias the roll cage to a neutral position where the roll cage is not indexed.

3. The bi-directional overrunning clutch assembly of claim 1, wherein at least one of the indexing devices includes an electromagnetic coil assembly that includes a coil, and an armature plate, the armature plate being engaged with the roll cage.

4. The bi-directional overrunning clutch assembly of claim 2, wherein the clutch housing includes a clutch pin extending outward from one side of the clutch housing; and wherein the spring assembly includes a torsion spring disposed on a spring retainer, the torsion spring having a generally circular shape with ends that overlap, each end including an arm that extends at a generally right angle to where it attaches to the spring, the arms defining a gap therebetween, the spring retainer including a pin that extends out from one side of the retainer and into the gap, and wherein the clutch pin on the clutch housing extends into the gap with the arms on either side of the clutch pin.

5. The bi-directional overrunning clutch assembly of claim 1, wherein the first indexing device includes a drive coil assembly attached to the differential housing at a location radially outward from one of the hubs, and a first armature plate disposed about the hub and adjacent to the drive coil assembly, the armature plate engaged with the roll cage.

6. The bi-directional overrunning clutch assembly of claim 5, wherein the electrically controlled assembly of the second indexing device is a backdrive coil assembly, and wherein the second indexing device includes a second armature plate disposed about the same hub as the backdrive coil assembly and adjacent to the backdrive coil assembly, the second armature plate engaged with the roll cage, the hub plate positioned between the backdrive coil assembly and the second armature plate, wherein the backdrive coil assembly is electrically connected to the electronic control system.

7. The bi-directional overrunning clutch assembly of claim 6, wherein the hub that the second armature plate is disposed about is the same hub that the first armature plate is disposed about, and wherein the second armature plate includes a plurality of tangs which protrude toward the roll cage, each tang engaging a slot in the roll cage so that the second armature plate is configured to rotate with the roll cage relative to the differential housing.

8. The bi-directional overrunning clutch assembly of claim 7, wherein the first drive coil assembly and the backdrive coil assembly are mounted to the differential housing, the backdrive coil assembly being at a location radially inward from the first drive coil assembly.

9. The bi-directional overrunning clutch assembly of claim 8, wherein the hub plate includes a plurality of teeth formed on an inner diameter of the hub plate that engage with splines formed on the hub.

10. The bi-directional overrunning clutch assembly of claim 6, wherein the clutch housing includes a clutch pin extending outward from one side of the clutch housing; and wherein the spring assembly includes a torsion spring disposed on a spring retainer, the torsion spring having a generally circular shape with ends that overlap, each end including an arm that extends at a generally right angle to where it attaches to the spring, the arms defining a gap therebetween, the spring retainer including a pin that extends out from one side of the retainer and into the gap, and wherein the clutch pin on the clutch housing extends into the gap with the arms on either side of the clutch pin; and wherein the first armature plate includes a plurality of tangs which protrude toward the roll cage and engage with corresponding slots formed in the roll cage, and wherein the spring retainer is disposed about the clutch housing and includes a plurality of lugs that protrude from one side of the spring retainer and engage with slots formed in the first armature plate so that the spring retainer and the first armature plate rotate with the roll cage relative to the differential housing.

11. The bi-directional overrunning clutch assembly of claim 1, wherein the first indexing device includes a first armature plate engaged with the roll cage, and wherein the first indexing device when activated causes dragging of the first armature plate relative to the clutch housing so as to cause the indexing of the roll cage; and wherein the second indexing device includes a second armature plate engaged with the roll cage, and wherein the electronically controlled assembly of the second indexing device when activated causes dragging of the second armature plate relative to the clutch housing so as to cause the indexing of the roll cage.

12. The bi-directional overrunning clutch assembly of claim 11, wherein the first indexing device includes an electrically controlled assembly selected from a group consisting of an electromagnetic device, a pneumatic device, and a hydraulic device.

13. The bi-directional overrunning clutch assembly of claim 11, wherein the electronic control system includes at least one switch for activating and deactivating the first and second indexing devices.

14. The bi-directional overrunning clutch assembly of claim 13, wherein the at least one switch includes two switches, a first switch for manually activating and deactivating the first indexing device, and a second switch for automatically activating and deactivating the electronically controlled assembly of the second indexing device.

15. The bi-directional overrunning clutch assembly of claim 14, wherein the automatic switch is a throttle position sensor configured to, when the first switch is activated, and following a depressing of the throttle, sense when the throttle is released and activating the electronically controlled assembly.

16. A bi-directional overrunning clutch assembly for engaging secondary driven shafts in a four wheel drive vehicle, the assembly comprising:
   a differential housing including a differential case and a cover removably mounted to the case;
   a pinion input gear rotatably disposed within case and including a shaft extending out from the case and adapted to engage a drive shaft, the pinion input gear rotatable within the case;
   a ring gear located within the differential case and engaged with the pinion input gear such that rotation of the pinion input gear produces rotation of the ring gear;
   a bi-directional overrunning clutch housing formed on or attached to the ring gear such that rotation of the ring gear produces corresponding rotation of the clutch housing, the clutch housing having an internal diameter with a contoured surface, the clutch housing having a clutch pin extending outward from one side of the clutch housing;
   a pair of hubs substantially coaxially aligned with each other and located within the clutch housing, each hub adapted to engage an end of a secondary driven shaft;
   a roll cage assembly located within the clutch housing and including a roll cage with two sets of rolls, each roll disposed within a slot formed in the roll cage, the rolls spaced around the circumference of the cage, and a plurality of springs for positioning the rolls in the slots, wherein one set of rolls is located between a portion of the contoured surface of the clutch housing and an outer surface of one hub, and the other set of rolls is located between a portion of the contoured surface of the clutch housing and an outer surface of the other hub;
   an electromagnetic system for indexing the roll cage relative to the clutch housing, the electromagnetic system including first and second indexing devices for indexing the roll cage, and an electronic control system connected to each indexing device for activating the indexing devices,
   the first indexing device configured when activated to cause the roll cage to index in a first direction relative to the clutch housing so as to index the roll cage into an active drive state where the rolls are positioned to cause the secondary drive shaft to be coupled to the secondary driven axles when four wheel drive is needed, the first indexing device including an electronically controlled drive assembly attached to the differential housing at a location radially outward from one of the hubs, and a first armature plate disposed about the hub and adjacent to the electronically controlled drive assembly, the armature plate engaged with the roll cage; and
   the second indexing device configured when activated to cause the roll cage to advance in a second direction relative to the clutch housing that is opposite from the first direction so as to cause the roll cage to index into an active backdrive state where the rolls are positioned to cause the secondary driven shafts to be coupled to the secondary drive shaft for providing torque transfer from the secondary driven shafts to the secondary drive shaft during an engine braking condition; the second indexing device including an electronically controlled backdrive assembly attached to the differential at a location radially outward from one of the hubs, a second armature plate disposed about the same hub as the electronically controlled backdrive assembly and adjacent to the electronically controlled backdrive assembly, the second armature plate engaged with the roll cage, and a hub plate positioned between the electronically controlled backdrive assembly and the second armature plate, the hub plate engaged with the same hub as the electronically controlled backdrive assembly so as to rotate in combination with that hub, the electronically controlled backdrive assembly being electrically connected to the electronic control system.

17. The bi-directional overrunning clutch assembly of claim 16, wherein the hub that the second armature plate is disposed about is the same hub that the first armature plate is disposed about, and wherein the second armature plate is engaged to the roll cage through a plurality of tangs that engage with corresponding slots, the tangs and slots being formed on either or both of the second armature plate and the roll cage.

18. The bi-directional overrunning clutch assembly of claim 16, wherein the electronically controlled drive assembly is an electromagnetic drive coil assembly and the electronically controlled backdrive assembly is an electromagnetic backdrive coil assembly.

19. The bi-directional overrunning clutch assembly of claim 18, wherein drive coil assembly and the backdrive coil assembly are mounted to the differential housing, the backdrive coil assembly being at a location radially inward from the first drive coil assembly.

20. The bi-directional overrunning clutch assembly of claim 16, wherein the hub plate includes a plurality of teeth formed on an inner diameter of the hub plate that engage with splines formed on the hub.

21. The bi-directional overrunning clutch assembly of claim 16, further comprising a spring assembly configured to bias the roll cage to a neutral position where the roll cage is not indexed, the spring assembly including a torsion spring disposed on a spring retainer, the torsion spring having a generally circular shape with ends that overlap, each end including an arm that extends at a generally right angle to where it attaches to the spring, the arms defining a gap there between, the spring retainer disposed about or adjacent to the clutch housing and engaged with at least one of the indexing devices so as to rotate relative to the clutch housing as the indexing devices are indexed, the spring retainer including a pin that extends out from one side of the retainer and into the gap, and wherein the clutch pin on the clutch housing extends into the gap with the arms on either side of the clutch pin.

22. The bi-directional overrunning clutch assembly of claim 21, wherein the first armature plate is attached to the roll cage so as to rotate in combination therewith, and wherein the spring retainer is attached to the first armature plate so that when the first armature plate is indexed it causes the spring retainer to index relative to the clutch housing.

23. The bi-directional overrunning clutch assembly of claim 22, wherein attachment between the roll cage and the first armature plate is provided by a plurality of tangs which engage with corresponding slots, the tangs and slots being formed on either or both of the first armature plate and the roll cage, and wherein the spring retainer is engaged with the first armature plate through a plurality of lugs which engage with corresponding slot, the lugs and slots being formed on either or both of the first armature plate and the spring retainer.

24. The bi-directional overrunning clutch assembly of claim 16, wherein the electrically controlled drive assembly is selected from a group consisting of an electromagnetic device, a pneumatic device, and a hydraulic device.

25. The bi-directional overrunning clutch assembly of claim 16, wherein the electrically controlled backdrive assembly is selected from a group consisting of an electromagnetic device, a pneumatic device, and a hydraulic device.

26. The bi-directional overrunning clutch assembly of claim 16, wherein the electronic control system includes at least one switch for activating and deactivating the first and second indexing devices.

27. The bi-directional overrunning clutch assembly of claim 26, wherein the at least one switch includes two switches, a first switch for manually activating and deactivating the electronically controlled drive assembly, and a second switch for automatically activating and deactivating the electronically controlled backdrive assembly.

28. The bi-directional overrunning clutch assembly of claim 27, wherein the automatic switch is a throttle position sensor configured to, when the first switch is activated, and following a depressing of the throttle, sense when the throttle is released and activating the electronically controlled backdrive assembly.

* * * * *